United States Patent
Hui et al.

(10) Patent No.: US 8,897,144 B2
(45) Date of Patent: Nov. 25, 2014

(54) QUALITY OF USER EXPERIENCE TESTING FOR VIDEO TRANSMISSIONS

(71) Applicant: T-Mobile USA, Inc, Bellevue, WA (US)

(72) Inventors: Jie Hui, Mercer Island, WA (US); Mohamad F. Ezzeddine, Kirkland, WA (US); Mathew Samuel, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 120 days.

(21) Appl. No.: 13/649,818

(22) Filed: Oct. 11, 2012

(65) Prior Publication Data

US 2013/0096904 A1    Apr. 18, 2013

Related U.S. Application Data

(60) Provisional application No. 61/547,652, filed on Oct. 14, 2011.

(51) Int. Cl.

| | |
|---|---|
| *H04H 60/32* | (2008.01) |
| *H04L 29/06* | (2006.01) |
| *H04N 17/00* | (2006.01) |
| *H04N 21/414* | (2011.01) |
| *H04N 21/442* | (2011.01) |
| *H04N 21/61* | (2011.01) |
| *H04L 12/24* | (2006.01) |

(52) U.S. Cl.
CPC .............. *H04L 65/80* (2013.01); *H04H 60/32* (2013.01); *H04N 17/004* (2013.01); *H04N 21/41407* (2013.01); *H04N 21/44209* (2013.01); *H04N 21/6131* (2013.01); *H04L 41/145* (2013.01); *H04L 41/5067* (2013.01); *H04L 65/605* (2013.01)

USPC .............. 370/241; 370/250; 370/252; 725/14

(58) Field of Classification Search
USPC ........................ 370/241, 250, 252; 725/14–21
See application file for complete search history.

(56) References Cited

U.S. PATENT DOCUMENTS

| | | |
|---|---|---|
| 2009/0034426 A1 | 2/2009 | Luft et al. |
| 2009/0138932 A1 | 5/2009 | Bauchot et al. |
| 2009/0154368 A1 | 6/2009 | Kim et al. |
| 2010/0058409 A1* | 3/2010 | Chapman et al. .............. 725/106 |
| 2010/0166051 A1 | 7/2010 | Chung et al. |
| 2011/0254961 A1* | 10/2011 | Putnam et al. ................. 348/180 |

OTHER PUBLICATIONS

The PCT Search Report and Written Opinion mailed Mar. 28, 2013 for PCT Application No. PCT/US12/60063, 12 pages.

* cited by examiner

*Primary Examiner* — Hoon J Chung
(74) *Attorney, Agent, or Firm* — Lee & Hayes, PLLC

(57) ABSTRACT

Techniques for calculating quality of user experience (QoE) scores for video streams as played on receiving devices are described herein. Prior to calculating a QoE score, a device receives a video of a display screen of a receiving device captured while the receiving device plays a video stream. The device also receives transmission metrics from at least one device engaged in the transmission of the video stream to the receiving device. The device then calculates the QoE score for that received video based at least in part on a reference video, the transmission metrics, and one or more QoE models. Additionally, prior to receiving the video or the transmission metrics, the device may automate the transmission of the reference video as the video stream from a sending device to the receiving device over at least one network emulator, including providing network impairment settings to the network emulator.

20 Claims, 4 Drawing Sheets

QUALITY OF USER EXPERIENCE TESTING FOR VIDEO TRANSMISSIONS

RELATED APPLICATIONS

This application claims priority to U.S. provisional patent application number 61/547,652, entitled "Multimedia QoE Video Lab" and filed on Oct. 14, 2011. Application No. 61/547,652 is fully incorporated herein by this reference.

BACKGROUND

With advances in network technology, handheld devices, and data transmission techniques, use of handheld devices to enjoy high-bandwidth-consuming media, such as video streams, is increasing. Users now engage in playback of videos from remote video stream servers, in video chats, in video conferences, and in online gaming. To quantify the quality of user experience (QoE) of users consuming videos, the International Telecommunication Union (ITU-T) have defined a "perceptual analysis" recommendation for determining a mean opinion score (MOS) in the J.341 standard. The MOS represents a user's perception of quality, and can be determined subjectively, by a panel of users, or objectively, based on a model. The model may in turn be based on multiple subjective judgments associated with multiple videos.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for calculating quality of user experience (QoE) scores for video streams as played on receiving devices. Prior to calculating a QoE score, a device, such as a test controller device of a video testing system, receives a video of a receiving device's display screen captured while the receiving device plays a video stream. The device also receives transmission metrics from at least one device engaged in the transmission of the video stream to the receiving device. The device then calculates the QoE score for that received video based at least in part on a reference video, the transmission metrics, and one or more QoE models. Additionally, prior to receiving the video or the transmission metrics, the device may automate the transmission of the reference video as the video stream from a sending device to the receiving device over at least one network emulator. Such automating may include providing network impairment settings to the network emulator.

The device may then repeat its operations multiple times with a given set of network impairment settings and other times with other impairment settings. By performing multiple tests under varying circumstances, the video testing system will arrive at QoE scores that accurately reflect the experiences of users.

Example Test System

Figure 1A:
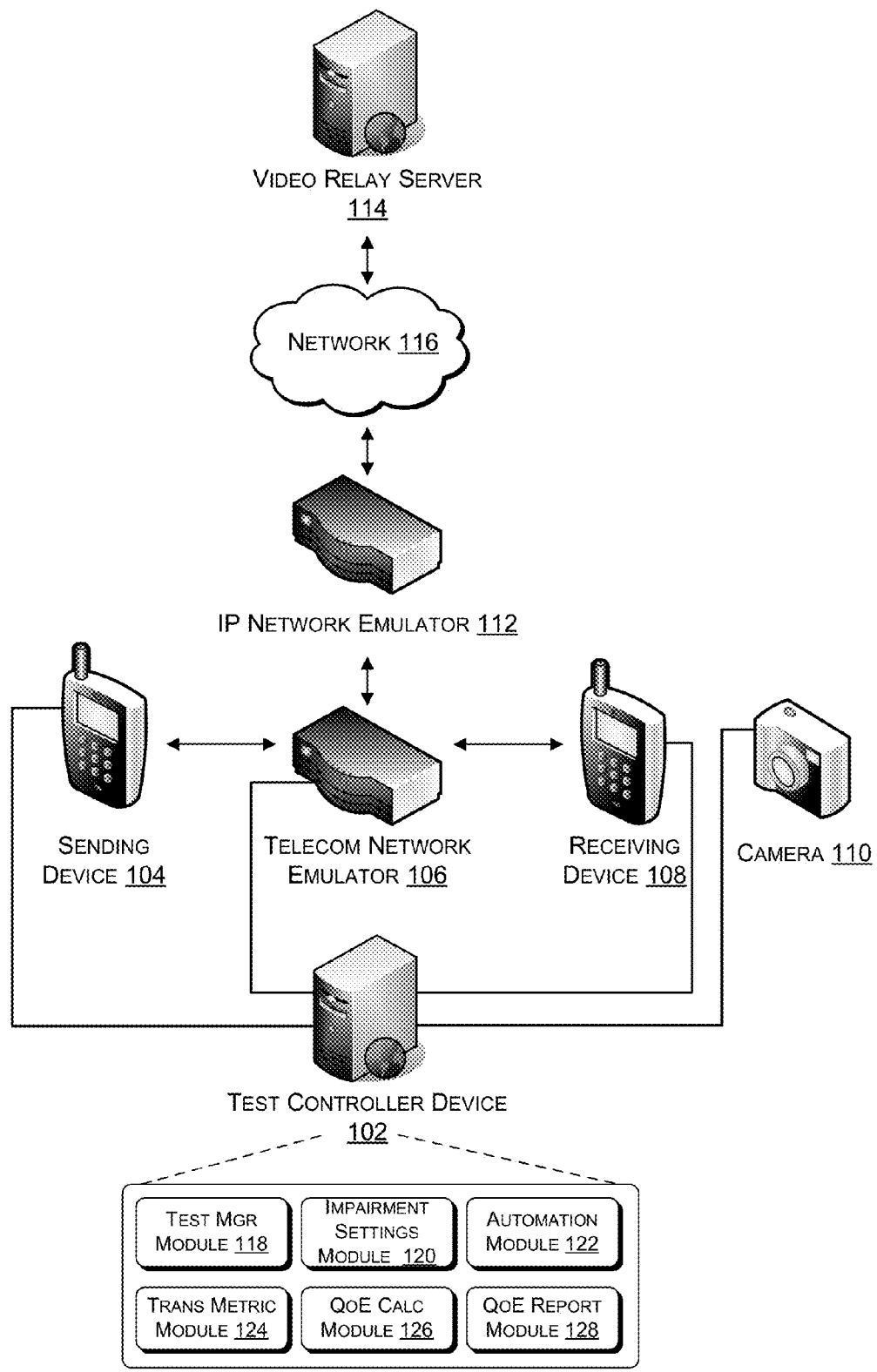
FIG. 1a illustrates a video QoE testing system that includes a test controller device, a sending device, at least one network emulator, a receiving device, and a camera, the system calculating a QoE score for the experience of the user viewing the transmitted video stream as it is played on the receiving device.

FIG. 1a illustrates a video QoE testing system that includes a test controller device, a sending device, at least one network emulator, a receiving device, and a camera, the system calculating a QoE score for the experience of the user viewing the transmitted video stream as it is played on the receiving device. As illustrated, a test controller device 102 may automate a transmission of a video stream from a sending device 104 through at least one network emulator 106 to a receiving device 108. While the receiving device 108 plays the video stream, a camera 110 captures a video of its display screen and provides that video to the test controller device 102. In some embodiments, the test controller device 102 may instruct the sending device 104 to transmit the video stream through an IP network emulator 112 to a video relay server 114 over a network 116, such as the Internet. In order to automate the transmission of the video stream and to calculate a QoE score for the video captured by the camera 110, the test controller device 102 may be configured with a number of modules, such as a test manager module 118, an impairment settings module 120, an automation module 122, a transmission metrics module 124, a QoE calculation module 126, and a QoE report module 128.

Figure 2:
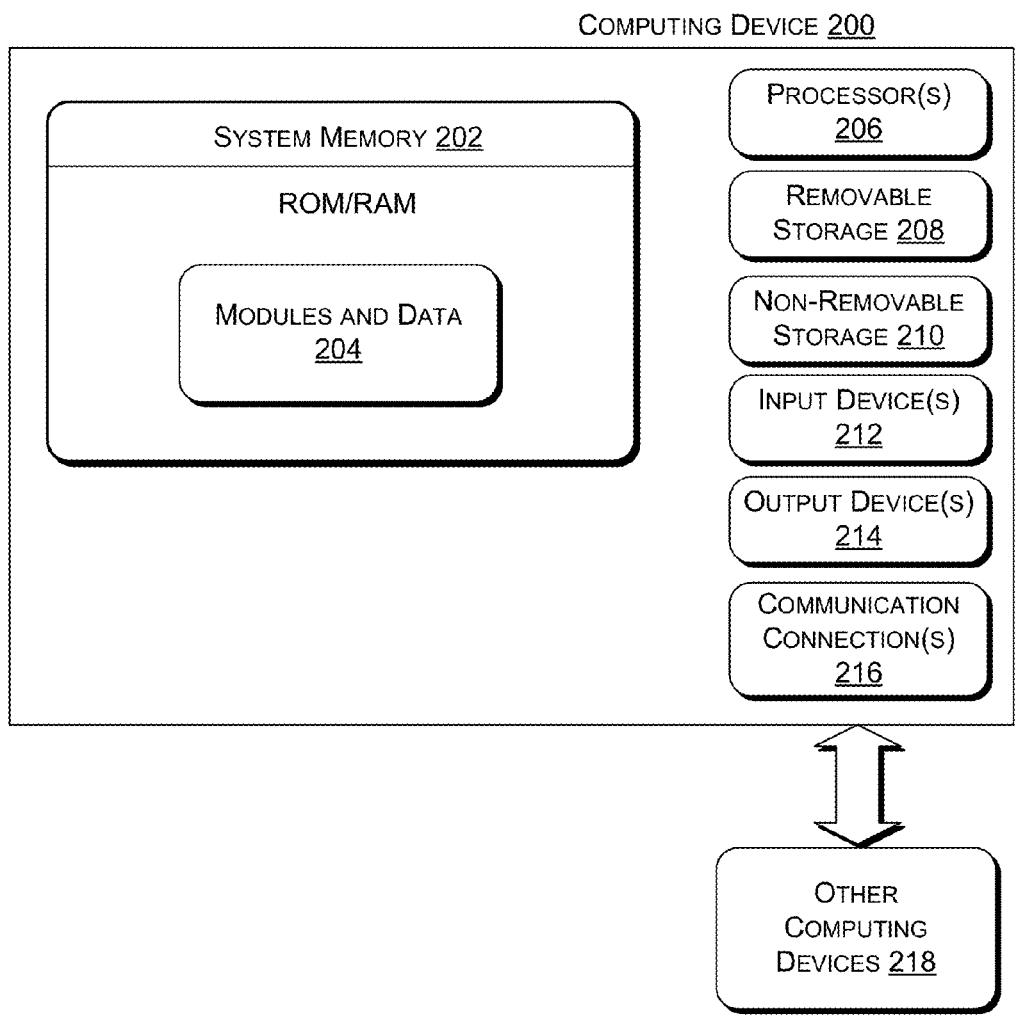
FIG. 2 illustrates a component level view of a computing device capable of acting as a test controller device, a sending device, a receiving device, a camera, a telecommunication network emulator, an Internet Protocol (IP) network emulator, a video relay server, or a video streaming server.

In various embodiments, the test controller device 102, the sending device 104, the telecommunication network emulator 106, the receiving device 108, the camera 110, the IP network emulator 112, and the video relay server 114 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some implementations, one or more of the test controller device 102, the sending device 104, the telecommunication network emulator 106, the receiving device 108, the camera 110, the IP network emulator 112, and the video relay server 114 may be one or more virtual machines implemented on one or more computing devices. An example computing device capable of serving as the test controller device 102, the sending device 104, the telecommunication network emulator 106, the receiving device 108, the camera 110, the IP network emulator 112, or the video relay server 114 is illustrated in FIG. 2 and described below with reference to that figure.

In some embodiments, the sending device 104 may be configured to wirelessly communicate with the telecommunication network emulator 106 over one or more radio frequencies. The sending device 104 may also be physically coupled to the test controller device 102 via, for example, a Universal Serial Bus (USB) connector, an Ethernet connector, or some other type of connector. Also, the sending device 104 may receive a reference video and/or automation instructions from the test controller device 102. Based on those instructions, the sending device 104 may establish a video chat, video conference, or other connection to the receiving device 108, and may transmit the reference video as a video stream to the receiving device 108 through the telecommunication network emulator 106. In some embodiments, the video stream may be transmitted in a peer-to-peer (P2P) manner; in others, the sending device 104 may direct the video stream to a video relay server 114 for subsequent transmission to the receiving device 108. In other embodiments, the transmission may be initiated by a user rather than responsive to automation instructions. In either case, while transmitting the video stream, the sending device 104 may record transmission metrics, such as frame rate, bit rate, round trip time, call establishment time, or encoding rate, and may provide the transmission metrics to the test controller device 102 either automatically or upon request.

In various embodiments, the telecommunication network emulator 106 may emulate any sort of telecommunication network, such as a Global System for Mobile Communications (GSM) network, a Universal Mobile Telecommunication System (UMTS) network, an Evolved High-Speed Packet Access (HSPA+) network, or a Long Term Evolution (LTE) network. The telecommunication network emulator 106 may include one or more base station emulator components capable of transmitting and receiving on one or more radio frequencies. For example, the telecommunication network emulator 106 may include a first base station emulator component for communicating with the sending device 104 and a second base station emulator component for communicating with the receiving device 108. In addition, the telecommunication network emulator 106 may have wired or wireless connections to an IP network emulator 112 or to a network 116. Further, the telecommunication network emulator 106 may be physically coupled to the test controller device 102 via, for example, a USB connector, an Ethernet connector, or some other type of connector.

In some embodiments, the telecommunication network emulator 106 may be configured to receive network impairment settings from the test controller device 102 and to perform the transmission of the video stream in accordance with those settings. For example, the network impairment settings may specify a radio frequency (RF) impairment, and the telecommunication network emulator 106 may transmit the video stream under the conditions of that RF impairment. Also, the telecommunication network emulator 106 may examine packets transmitting the video stream to determine whether the transmission is P2P or client-server. If P2P, the telecommunication network emulator 106 may then transmit the video stream to the receiving device 108. If client-server, the telecommunication network emulator 106 may transmit the video stream to the video relay server 114 through the IP network emulator 112, may receive the video stream back from the video relay server 114, and may then transmit the video stream to the receiving device 108. While transmitting the video stream, the telecommunication network emulator 106 may record transmission metrics, such as radio frequency, frame rate, bit rate, round trip time, call establishment time, or encoding rate, and may provide the transmission metrics to the test controller device 102 either automatically or upon request.

In various embodiments, the receiving device 108 is configured to receive automation instructions from the test controller device 102 and a video stream from the sending device 104. The receiving device 108 may be physically coupled to the test controller device 102 via, for example, a USB connector, an Ethernet connector, or some other type of connector. The instructions may include instructions to accept a connection for a video chat, video conference or video broadcast and to play a video stream associated with that connection upon receiving the video stream. In other embodiments, rather than receiving automation instructions, the receiving device 108 may accept the connection responsive to user input. While playing the video stream, the receiving device 108 may simultaneously record the video stream in the manner that it is played, without any post-processing of the recorded video to remove delay, missed frames, etc. The receiving device 108 may then provide the recorded video to the test controller device 102, either automatically or upon request. Also while receiving and playing the video stream, the receiving device 108 may record transmission metrics, such as frame rate, bit rate, round trip time, call establishment time, or encoding rate, and may provide the transmission metrics to the test controller device 102 either automatically or upon request.

In some embodiments, the camera 110 may be configured to receive instructions from the test controller device 102 to record a video of a display screen of the receiving device 108. The camera 110 may be physically coupled to the test controller device 102 via, for example, a USB connector, an Ethernet connector, or some other type of connector. The instructions may be timed such that they cause recording of the video to start when playback starts on the receiving device 108. The camera 110 may also receive instructions to stop recording. Upon completion of the recording, the camera 110 may provide the video to the test controller device 102.

In various embodiments, the IP network emulator 112 may be configured to receive network impairment settings from the test controller device 102 and to perform the transmission of the video stream in accordance with those settings. For example, the network impairment settings may specify one or more IP impairments, such as packet loss, transmission delay, data corruption, or limited throughput, and the IP network emulator 112 may transmit the video stream under the conditions of those IP impairment(s). Also, the IP network emulator 112 may receive the video stream from a telecommunication network emulator 106 that is coupled to the IP network emulator 112, may transmit the video stream to the video relay server 114, which may be coupled to the IP network emulator 112 either directly or through a network 116, may receive the video stream back from the video relay server 114, and may then transmit the video stream to the receiving device 108 through the telecommunication network emulator 106. While transmitting the video stream, the IP network emulator 112 may record transmission metrics, such as frame rate, bit rate, round trip time, call establishment time, or encoding rate, and may provide the transmission metrics to the test controller device 102 either automatically or upon request.

In some embodiments, the video relay server 114 may be configured to receive a video stream destined for the receiving device 108 and may transmit the video stream to the receiving device 108. The video stream may be received from and transmitted to an IP network emulator 112, either directly or through a network 116.

In further embodiments, the network 116 may be any one or more networks, such as wired networks, wireless networks, and combinations of wired and wireless networks. Further, the network 116 may include any one or combination of multiple different types of public or private networks (e.g., cable networks, the Internet, wireless networks, etc.). In some instances, computing devices communicate over the network 116 using a secure protocol (e.g., https) and/or any other protocol or set of protocols, such as the transmission control protocol/Internet protocol (TCP/IP).

As illustrated in FIG. 1a, the test controller device 102 may be configured with a number of modules configured to perform a video transmission performance test. These modules include a test manager module 118. The test manager module 118 initiates the test, either automatically, based on settings, or responsive to user input. Such user input may be received, for example, via a test user interface. The user or settings may also specify a number of different network impairment settings to test and a given number of tests to perform for specific network impairment settings. Alternatively, a default suite of network impairment settings and default number of test iterations may be used.

In some embodiments, upon initiating a test, the test manager module 118 invokes the impairment settings module 120 and specifies network impairment settings that are to be provided to one or both of the telecommunication network emulator 106 and the IP network emulator. Examples of such network impairment settings are mentioned above. The impairment settings module 120 then provides the network impairment settings, and upon determining that the network impairment settings have been successfully applied, notifies the test manager module 118.

The test manager module 118 then invokes the automation module 122 to automate a transmission of a video stream from the sending device 104 to the receiving device 108. The automation module 122 may provide a reference video to the sending device 104 along with instructions to transmit the reference video as a video stream to the receiving device 108. The instructions may also specify whether the transmission is to be a P2P transmission or a client-server transmission that uses the video relay server 114. The automation module 122 may also provide instructions to the telecommunication network emulator 106 and IP network emulator 112 to transmit the video stream upon receiving it, and to the receiving device 108. The instructions to the receiving device 108 may tell the receiving device 108 to accept a communication from the sending device 104 and to open and play the video stream associated with the communication upon receipt. In some embodiments, the automation module 122 also either instructs the receiving device 108 to record the playback of the video stream as a video file or instructs a camera 110 to record a video of the display screen of the receiving device 108 as the receiving device 108 plays the video stream. If instructing the camera 110, the automation module 122 may time the instructions such that the camera 110 initiates video capture operations substantially simultaneously with the beginning of playback on the receiving device 108. After providing the instructions, the automation module 122 notifies the test manager module 118 that the instructions have been provided.

In various embodiments, the test manager module 118 then invokes a transmission metrics module 124 to receive or retrieve transmission metrics from one or more of the sending device 104, the telecommunication network emulator 106, the receiving device 108, or the IP network emulator 112. Examples of such transmission metrics are mentioned above. The transmission metrics module 124 then provides the transmission metrics modules 124 to the test manager module 118.

Upon receiving the transmission metrics, the test manager module 118 invokes the QoE calculation module 126 and provides the QoE calculation module 126 with the transmission metrics. The QoE calculation module 126 also retrieves or receives a video of the video stream playback from the receiving device 108 or the camera 110. Using one or more QoE models, the QoE calculation module 126 then calculates a QoE score for the video. For example, the QoE calculation module 126 may use a first QoE model, the video, and the reference video to calculate a QoE score for the video based on the reference video and the first QoE model. The QoE calculation module 126 may then use one or more second QoE models, the transmission metrics, and the video to calculate one or more additional QoE scores for the video based on the transmission metrics and the second QoE model(s). Next, the QoE calculation module 126 may utilize a third QoE model that gives weights to QoE scores based on whether they were calculated using the reference video or a specific transmission metric in order to synthesize the QoE scores into a single QoE score for the video. In other embodiments, rather than using the transmission metrics and second QoE model(s) to calculate additional QoE scores, the QoE calculation module 126 may use the transmission metrics and second QoE models to calculate QoE score adjustments that are added to or subtracted from the QoE score. Upon calculating a QoE score for the video, the QoE calculation module 126 may provide that QoE score to the test manager module 118.

In various embodiments, the test manager module 118 then determines whether additional test iterations should be performed using the network impairment settings. For example, the test manager module 118 may determine that three tests are to be performed for a given set of network impairment settings, and that two more test iterations need to be performed. In such a case, the test manager module 118 may again invoke the automation module 122, the transmission settings module 124, and the QoE calculation module 126 to obtain a QoE score for each test iteration. Additionally, the test manager module 118 may determine if there are any other network impairment settings to test and, if there are, provides those network impairment settings via the impairment settings module 120 and performs test iterations using those network impairment settings.

At the completion of the test, the test manager module 118 has one or more QoE scores each associated with a test iteration and a set of network impairment settings. The test manager module 118 may synthesize some or all of the scores (e.g., calculate an average or median). The synthesized QoE score(s) may be a synthesis of all QoE scores or of QoE scores for a given set of network impairment settings. The test manager module 118 may then invoke the QoE report module 128 and provide the QoE score(s), the synthesized QoE score(s), and/or the transmission metrics to the QoE report module 128. The QoE report module 128 may then share the QoE score(s), the synthesized QoE score(s), and/or the transmission metrics with the user via, for example, the test user interface or another user interface.

In some embodiments, the test manager module 118 or QoE report module 128 may also produce a model from the one or more QoE scores, each of the one or more QoE scores associated with one or both of a given set of network impairment settings or with transmission metrics. The model may then be provided to and used by other users or entities to estimate QoE for their video playback experiences.

Figure 1B:
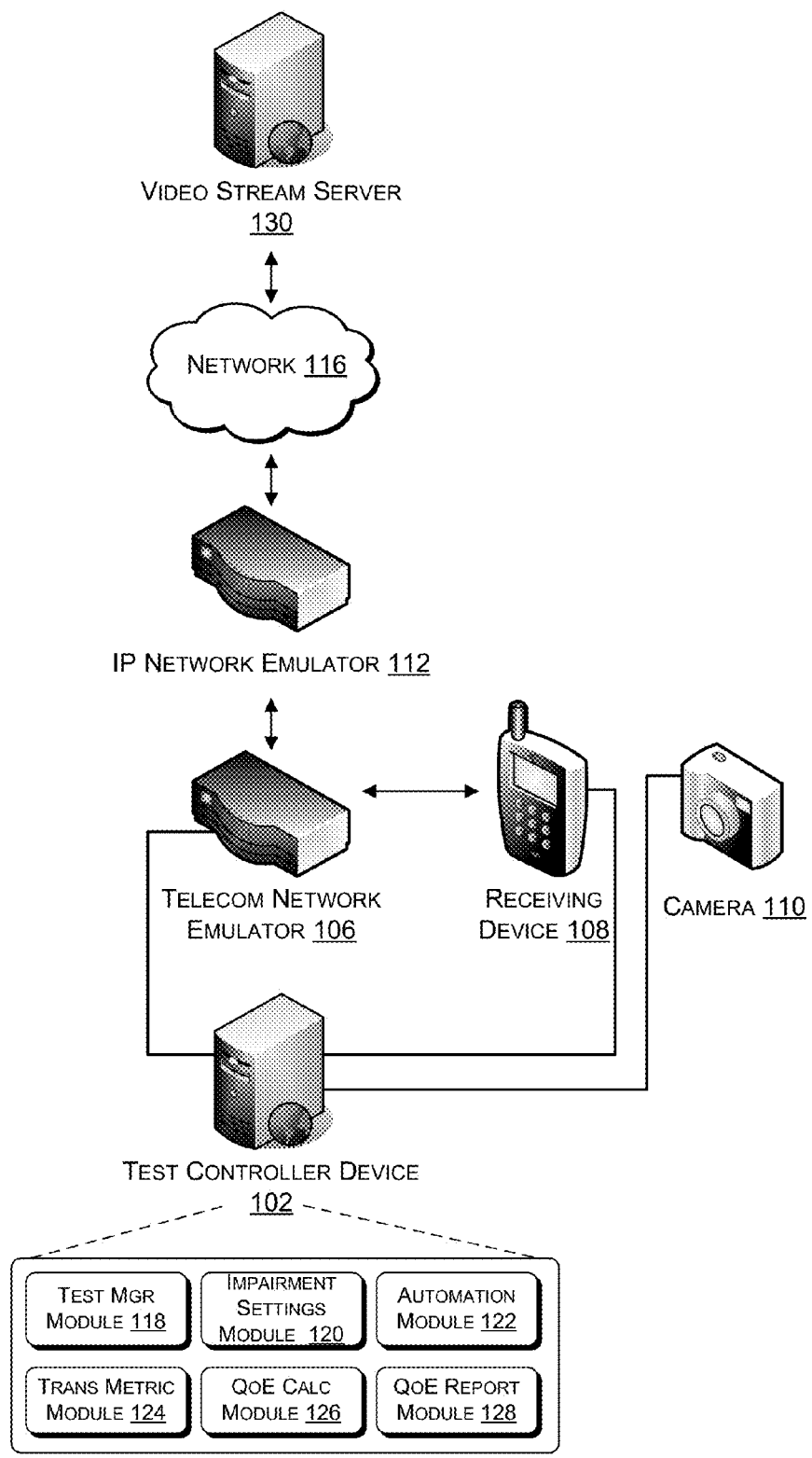
FIG. 1b illustrates a video QoE testing system that includes a test controller device, a video streaming server, at least one network emulator, a receiving device, and a camera, the system calculating a QoE score for the experience of the user viewing the transmitted video stream as it is played on the receiving device.

FIG. 1b illustrates a video QoE testing system that includes a test controller device, a video streaming server, at least one network emulator, a receiving device, and a camera, the system calculating a QoE score for the experience of the user viewing the transmitted video stream as it is played on the receiving device. In FIG. 1b, the video stream is provided by a video streaming server 130 rather than a sending device 104 or a video relay server 114.

The video streaming server 130 may be any sort of server configured to transmit a video stream, such as a web server that provides users with streamed videos playback via user web browsers. The video streaming server 130 may be physically coupled to the test controller device 102 via, for example, a USB connector, an Ethernet connector, or some other type of connector. In other embodiments, the video streaming server 130 may communicate with the test controller device 102 through a network, such as network 116. Also, the video streaming server 130 may receive a reference video and/or automation instructions from the test controller device 102. Based on those instructions, the video streaming server 130 may establish a data connection with the receiving device 108, and may transmit the reference video as a video stream to the receiving device 108 through the IP network emulator 112 and the telecommunication network emulator 106. While transmitting the video stream, the video streaming server 130 may record transmission metrics, such as frame rate, round trip time, or encoding rate, and may provide the transmission metrics to the test controller device 102 either automatically or upon request.

In some embodiments, the test manager module 118, impairment settings module 120, QoE calculation module 126, and QoE report module 128 operate the same in the video test system of FIG. 1b as in the video test system of FIG. 1a. The automation module 122 also operates the same, except that the reference video and transmission instructions are provided to the video streaming server 130 in place of the sending device 104. Further, the transmission metrics module operates the same, except that transmission metrics are retrieved or received from the video streaming server 130 in place of the sending device 104.

Example Device

FIG. 2 illustrates a component level view of a computing device capable of acting as a test controller device 102, a sending device 104, a telecommunication network emulator 106, a receiving device 108, a camera 110, an IP network emulator 112, a video relay server 114, or a video streaming server 130. As illustrated, computing device 200 comprises a system memory 202 storing modules and data 204. Also, computing device 200 includes processor(s) 206, a removable storage 208 and non-removable storage 210, input device(s) 212, output device(s) 214 and communication connections 216 for communicating with other computing devices 218.

In various embodiments, system memory 202 is volatile (such as RAM), non-volatile (such as ROM, flash memory, etc.) or some combination of the two. The modules or data 204 stored in the system memory 202 may comprise methods, threads, processes, applications or any other sort of executable instructions, such as the instructions utilized to perform the operations of the test controller device 102, the sending device 104, the telecommunication network emulator 106, the receiving device 108, the camera 110, the IP network emulator 112, the video relay server 114, or the video streaming server 130. The modules and data 204 may also include files and databases.

In some embodiments, the processor(s) 206 is a central processing unit (CPU), a graphics processing unit (GPU), or both CPU and GPU, or other processing unit or component known in the art.

Computing device 200 also includes additional data storage devices (removable and/or non-removable) such as, for example, magnetic disks, optical disks, or tape. Such additional storage is illustrated in FIG. 2 by removable storage 208 and non-removable storage 210. Tangible computer-readable media may include volatile and nonvolatile, removable and non-removable media implemented in any method or technology for storage of information, such as computer readable instructions, data structures, program modules, or other data. System memory 202, removable storage 208 and non-removable storage 210 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 200. Any such tangible computer-readable media may be part of the computing device 200.

Computing device 200 also has input device(s) 212, such as a keyboard, a mouse, a touch-sensitive display, voice input device, etc., and output device(s) 214 such as a display, speakers, a printer, etc. These devices are well known in the art and need not be discussed at length here.

Computing device 200 also contains communication connections 216 that allow the computing device 200 to communicate with other computing devices 218, such as others of the test controller device 102, the sending device 104, the telecommunication network emulator 106, the receiving device 108, the camera 110, the IP network emulator 112, the video relay server 114, or the video streaming server 130.

Example Processes

Figure 3:
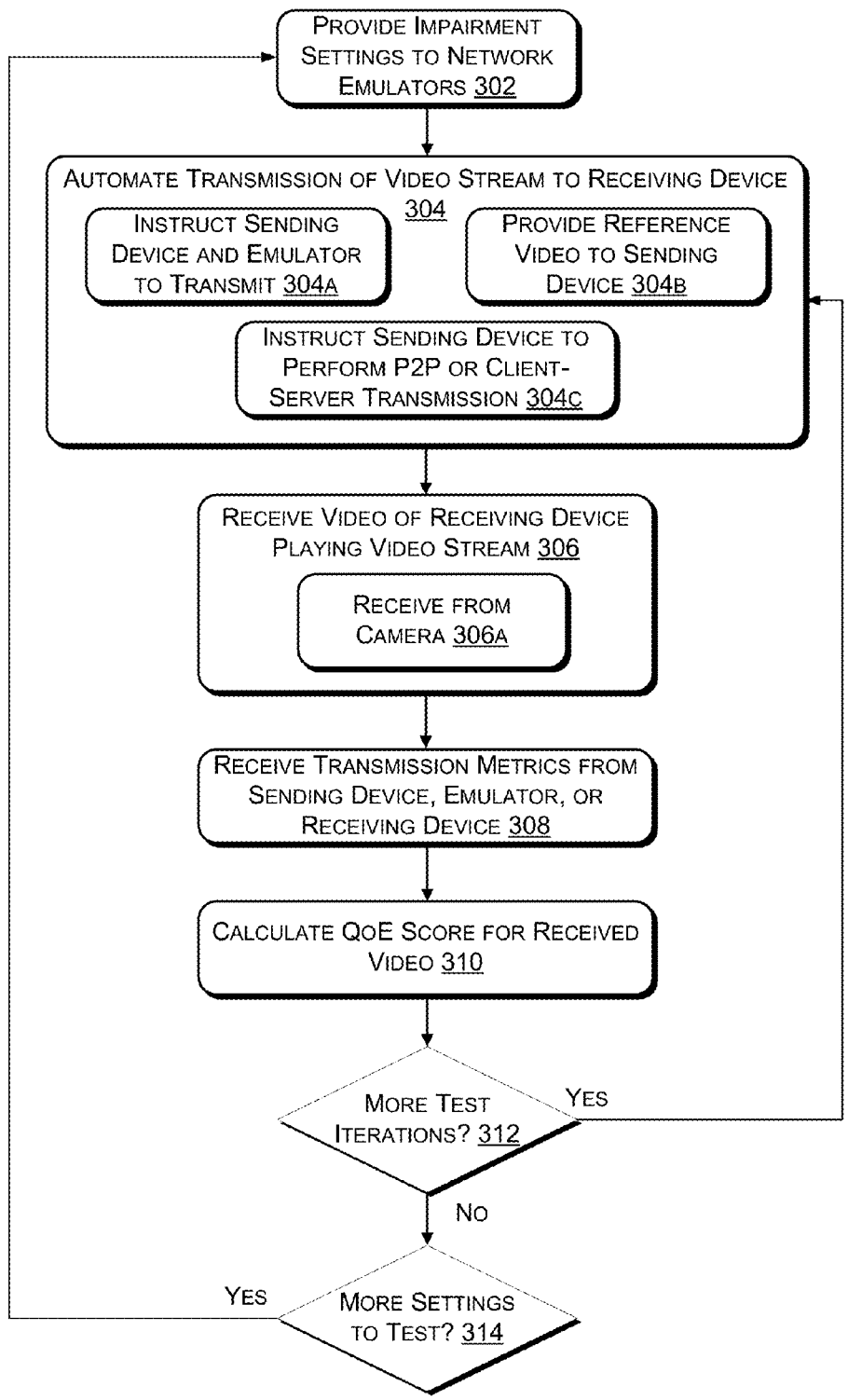
FIG. 3 illustrates an example process for calculating QoE scores for users' experiences of video stream playback on their receiving devices across multiple video stream transmissions and with varying transmission conditions.

FIG. 3 illustrates an example process 300. This process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for calculating QoE scores for users' experiences of video stream playback on their receiving devices across multiple video stream transmissions and with varying transmission conditions. The process 300 includes, at 302, providing, by a test controller device, network impairment setting to at least one network emulator. The at least one network emulator may be one of a telecommunication network emulator or an IP network emulator. The network impairment settings may include at least one of RF impairment settings, packet loss settings, transmission delay settings, data corruption settings, or throughput settings.

At 304, the test controller device automates a transmission of a reference video as a video stream from a sending device to a receiving device over at least one network emulator, including providing network impairment settings to the at least one network emulator. At 304a, the automating includes instructing the sending device or video stream server to transmit a reference video as the video stream, instructing the at least one network emulator to transmit the video stream to the receiving device, and instructing the receiving device to accept and play the video stream. At 304b the automating includes providing the reference video to the sending device or the video stream server. At 304c, the automating includes instructing the sending device to transmit the video stream to the receiving device in a peer-to-peer manner or in a client-server manner through a video relay server.

At 306, the test controller device receives a video of a display screen of a receiving device captured while the receiving device plays a video stream. At 306a, the receiving includes receiving the video from a camera or receiving the video from the receiving device. The receiving device may have received the video stream from a remote video stream server.

At 308, the test controller device receives transmission metrics from at least one device engaged in the transmission of the video stream to the receiving device. The transmission metrics may include at least one of a frame rate, a bit rate, a round trip time, a call establishment time, or an encoding rate.

At 310, the test controller device calculates a QoE score for the video based at least in part on the reference video, the transmission metrics, and one or more QoE models. The one or more QoE models may include at least one of a QoE model for calculating a first QoE score for the video based on the reference video or QoE models for calculating second QoE scores for the video based on the transmission metrics. Further, the one or more QoE models may include a QoE model for synthesizing the first and second QoE scores. Also or instead, the one or more QoE models may include a QoE model for calculating the first QoE score for the video based on the reference video and a QoE model for calculating QoE score adjustments based on the transmission metric.

At 312, the test controller device determines whether there are more test iterations to perform for a given reference video and set of network impairment settings. This may involve comparison of a counter to a setting or a threshold. If the test controller device determines that another test iteration should be performed, the test controller device repeats the operations shown at 304-310.

At 314, the test controller device determines whether there are other network impairment settings to test with a reference video. If there are other network impairment settings to test, then the test controller device repeats the operations shown at blocks 302-312.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   at least one network emulator component communicatively coupled to a sending device and a receiving device and configured to transmit a reference video as a video stream from the sending device to the receiving device;
   a camera configured to capture a video of a display screen of the receiving device while the receiving device plays the video stream; and
   a test controller device configured to:
      automate the transmission of the video stream from the sending device to the receiving device, including providing network impairment settings to the at least one network emulator,
      receive transmission metrics from at least one of the sending device, the receiving device, and the at least one network emulator,
      receive the video from the camera, and
      calculate a quality of user experience (QoE) score for the video based at least in part on the reference video, the transmission metrics, and one or more QoE models.

2. The system of claim 1, wherein the at least one network emulator is one of a telecommunication network emulator or an Internet Protocol (IP) network emulator.

3. The system of claim 1, wherein the sending device, the receiving device, the at least one network emulator, and the camera are each physically coupled to the test controller device.

4. The system of claim 1, further comprising a video relay server that is connected to the at least one network emulator via an IP network and configured to receive the video stream from the at least one network emulator and to transmit the video stream back to the at least one network emulator.

5. The system of claim 4, wherein the video relay server is configured to perform the transmission or receiving based on impairment settings.

6. A method comprising:
   receiving from a camera of a testing system, by a test controller device of the testing system, a video of a display screen of a receiving device captured by the camera while the receiving device plays a video stream;
   receiving, by the test controller device, transmission metrics from at least one device engaged in the transmission of a reference video as the video stream to the receiving device; and
   calculating, by the test controller device, a quality of user experience (QoE) score for the video based at least in part on the reference video, the transmission metrics, and one or more QoE models.

7. The method of claim 6, further comprising automating a transmission of the reference video as the video stream from a sending device to the receiving device over at least one network emulator, including providing network impairment settings to the at least one network emulator.

8. The method of claim 6, wherein the receiving device receives the video stream from a remote video server.

9. The method of claim 6, wherein the transmission metrics include at least one of a frame rate, a bit rate, a round trip time, a call establishment time, or an encoding rate.

10. The method of claim 6, wherein the one or more QoE models include at least one of a QoE model for calculating a first QoE score for the video based on the reference video or QoE models for calculating second QoE scores for the video based on the transmission metrics.

11. The method of claim 10, wherein the one or more QoE models include a QoE model for synthesizing the first and second QoE scores.

12. The method of claim 10, wherein the one or more QoE models include the QoE model for calculating the first QoE score for the video based on the reference video and a QoE model for calculating QoE score adjustments based on the transmission metrics.

13. One or more non-transitory computer-readable media having stored thereon a plurality of executable instructions, the executable instructions configured to program a test controller device of a testing system to perform operations comprising:
   automating a transmission of a reference video as a video stream from a sending device to a receiving device over at least one network emulator, including providing network impairment settings to the at least one network emulator;

receiving from a camera of the testing system a video of a display screen of the receiving device captured by the camera while the receiving device plays the video stream;

receiving transmission metrics from at least one device of the sending device, the receiving device, or the at least one network emulator; and calculating a quality of user experience (QoE) score for the video based at least in part on the reference video, the transmission metrics, and one or more QoE models.

14. The one or more non-transitory computer-readable media of claim 13, wherein the network impairment settings include at least one of radio frequency (RF) impairment settings, packet loss settings, transmission delay settings, data corruption settings, or throughput settings.

15. The one or more non-transitory computer-readable media of claim 13, wherein the automating includes instructing the sending device to transmit the reference video as the video stream, instructing the at least one network emulator to transmit the video stream to the receiving device, and instructing the receiving device to accept and play the video stream.

16. The one or more non-transitory computer-readable media of claim 13, wherein the automating includes providing the reference video to the sending device.

17. The one or more non-transitory computer-readable media of claim 13, wherein the automating includes instructing the sending device to transmit the video stream to the receiving device in a peer-to-peer manner or in a client-server manner through a video relay server.

18. The one or more non-transitory computer-readable media of claim 13, wherein the operations further comprise repeating the automating, the receiving the video, and the receiving the transmission metrics multiple times with the same network impairment settings and the same reference video and performing the calculating for the received videos based on the reference video, the received transmission metrics, and the one or more QoE models.

19. The one or more non-transitory computer-readable media of claim 18, wherein the operations further comprise repeating the automating, the receiving the video, the receiving the transmission metrics, and the calculating with different network impairment settings.

20. The one or more non-transitory computer-readable media of claim 19, wherein the operations further comprise producing a model associating QoE scores with one or both of network impairment settings or transmission metrics.

* * * * *